United States Patent
Cohen et al.

(10) Patent No.: US 9,154,709 B2
(45) Date of Patent: Oct. 6, 2015

(54) RECOMMENDING TRANSFORMATIONS FOR PHOTOGRAPHY

(71) Applicant: GOOGLE INC., Mountain View, CA (US)

(72) Inventors: Richard Zarek Cohen, Gateshead (GB); Robert William Hamilton, San Francisco, CA (US)

(73) Assignee: Google Inc., Mountain View, CA (US)

( * ) Notice: Subject to any disclaimer, the term of this patent is extended or adjusted under 35 U.S.C. 154(b) by 196 days.

(21) Appl. No.: 13/723,761

(22) Filed: Dec. 21, 2012

(65) Prior Publication Data

US 2014/0176732 A1 Jun. 26, 2014

(51) Int. Cl.
*H04N 5/232* (2006.01)
*H04N 5/262* (2006.01)

(52) U.S. Cl.
CPC ......... *H04N 5/2621* (2013.01); *H04N 5/23293* (2013.01); *H04N 5/23222* (2013.01)

(58) Field of Classification Search
CPC ............ H04N 5/2621; H04N 5/23293; H04N 5/23222; H04N 5/23219; H04N 21/4545; H04N 3/0018; H04N 19/117
USPC .................. 348/143, 149, 241, 231.5, 207.1; 725/105
See application file for complete search history.

(56) References Cited

U.S. PATENT DOCUMENTS

| | | | |
|---|---|---|---|
| 6,535,243 B1 * | 3/2003 | Tullis | 348/207.1 |
| 7,684,639 B2 | 3/2010 | Zhao et al. | |
| 8,049,811 B2 | 11/2011 | Gamadia et al. | |
| 8,527,492 B1 * | 9/2013 | Issa | 707/707 |
| 2007/0238954 A1 * | 10/2007 | White et al. | 600/407 |
| 2009/0162042 A1 | 6/2009 | Wexler et al. | |
| 2009/0231441 A1 | 9/2009 | Walker et al. | |
| 2010/0245596 A1 | 9/2010 | Tirpak et al. | |
| 2011/0134110 A1 * | 6/2011 | Song et al. | 345/419 |
| 2011/0211753 A1 | 9/2011 | Lee et al. | |
| 2011/0213795 A1 | 9/2011 | Lee et al. | |
| 2011/0292221 A1 | 12/2011 | Gu et al. | |
| 2012/0092515 A1 * | 4/2012 | Yim et al. | 348/222.1 |
| 2012/0176401 A1 | 7/2012 | Hayward et al. | |
| 2012/0229654 A1 * | 9/2012 | Solomon | 348/207.1 |
| 2012/0307096 A1 * | 12/2012 | Ford et al. | 348/222.1 |

OTHER PUBLICATIONS

International Search Report and Written Opinion cited in corresponding PCT/US2013/077327 mailed Mar. 7, 2014.

* cited by examiner

*Primary Examiner* — Hung Lam
(74) *Attorney, Agent, or Firm* — IP Spring

(57) ABSTRACT

A method, computer program product, and system is described. An aspect of an image is identified. One or more other images are identified based upon, at least in part, the one or more other images including one or more other aspects similar to the identified aspect of the image. One or more image filters associated with the one or more other images, including a first image filter, are identified. The first image filter is applied to the image.

17 Claims, 5 Drawing Sheets

RECOMMENDING TRANSFORMATIONS FOR PHOTOGRAPHY

TECHNICAL FIELD

This disclosure relates to photography.

BACKGROUND

Individuals may capture photographs (and/or other images) of various subjects in a variety of ways. In certain instances, individuals may employ digital cameras in order to capture digital photographs. Digital photographs (and/or other digital images) may be edited in various ways using various types of computing equipment (including digital cameras). Digital photographs (and/or other digital images) may be shared with others electronically. In certain instances, individuals may apply various filters (or transformations) to images, including digital photographs (and/or other digital images). A filter may be an physical object (e.g., a lens attachment) or an electronic process or application by which the appearance of an image (e.g., a photograph) may be altered from the image's un-filtered appearance.

BRIEF SUMMARY OF THE DISCLOSURE

According to one aspect of the disclosure, a computer-implemented method includes identifying, by one or more computing devices, a content-related aspect of a digital image. The method further includes identifying, by the one or more computing devices, one or more other digital images based upon, at least in part, the one or more other digital images including one or more other content-related aspects similar to the identified content-related aspect of the digital image. The method further includes identifying, by the one or more computing devices, one or more image filters, including a first image filter, associated with the one or more other digital images. The method further includes applying, by the one or more computing devices, the first image filter to the digital image.

According to another aspect of the disclosure, a computer-implemented method includes identifying, by one or more computing devices, an aspect of an image. The method further includes identifying, by the one or more computing devices, one or more other images based upon, at least in part, the one or more other images including one or more other aspects similar to the identified aspect of the image. The method further includes identifying, by the one or more computing devices, one or more image filters, including a first image filter, associated with the one or more other images. The method further includes applying, by the one or more computing devices, the first image filter to the image.

One or more of the following features may be included. The aspect of the image may be associated with the visual content of the image. Applying the first image filter to the image may include providing a list of image filters including the one or more identified image filters. Applying the first image filter to the image may include receiving a selection of the first image filter from the list of image filters. The method may include providing a preview of the effects of the first image filter on the image. Identifying the one or more other images may be based upon, at least in part, one or more indications of popularity associated with the one or more other images. Identifying the use of the one or more image filters, including the first image filter, on the one or more other images may include applying heuristic rules to identify an application of the one or more image filters. Identifying the use of the one or more image filters, including the first image filter, on the one or more other images may include identifying an application of a color-related filter based upon, at least in part, identifying color data associated with the one or more other images. Identifying the use of the one or more image filters, including the first image filter, on the one or more other images may include analyzing metadata associated with one or more of the one or more other images.

The image may include a view displayed on a viewfinder of a camera. One or more of identifying the aspect of the image, identifying the one or more other images, identifying the use of one or more image filters, and applying the first image filter to the image may occur in near real-time.

According to another aspect of the disclosure, a computer program product resides on a computer readable storage medium and has a plurality of instructions stored on it. When executed by a processor, the instructions cause the processor to perform operations including identifying an aspect of an image. The operations further include identifying one or more other images based upon, at least in part, the one or more other images including one or more other aspects similar to the identified aspect of the image. The operations further include identifying one or more image filters, including a first image filter, associated with the one or more other images. The operations further include applying the first image filter to the image.

One or more of the following features may be included. The aspect of the image may be associated with the visual content of the image. Applying the first image filter to the image may include providing a list of image filters including the one or more identified image filters. Applying the first image filter to the image may include receiving a selection of the first image filter from the list of image filters. The operations may include providing a preview of the effects of the first image filter on the image. Identifying the one or more other images may be based upon, at least in part, one or more indications of popularity associated with the one or more other images. Identifying the use of the one or more image filters, including the first image filter, on the one or more other images may include applying heuristic rules to identify an application of the one or more image filters. Identifying the use of the one or more image filters, including the first image filter, on the one or more other images may include identifying an application of a color-related filter based upon, at least in part, identifying color data associated with the one or more other images. Identifying the use of the one or more image filters, including the first image filter, on the one or more other images may include analyzing metadata associated with one or more of the one or more other images.

The image may include a view displayed on a viewfinder of a camera. One or more of identifying the aspect of the image, identifying the one or more other images, identifying the use of one or more image filters, and applying the first image filter to the image may occur in near real-time.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
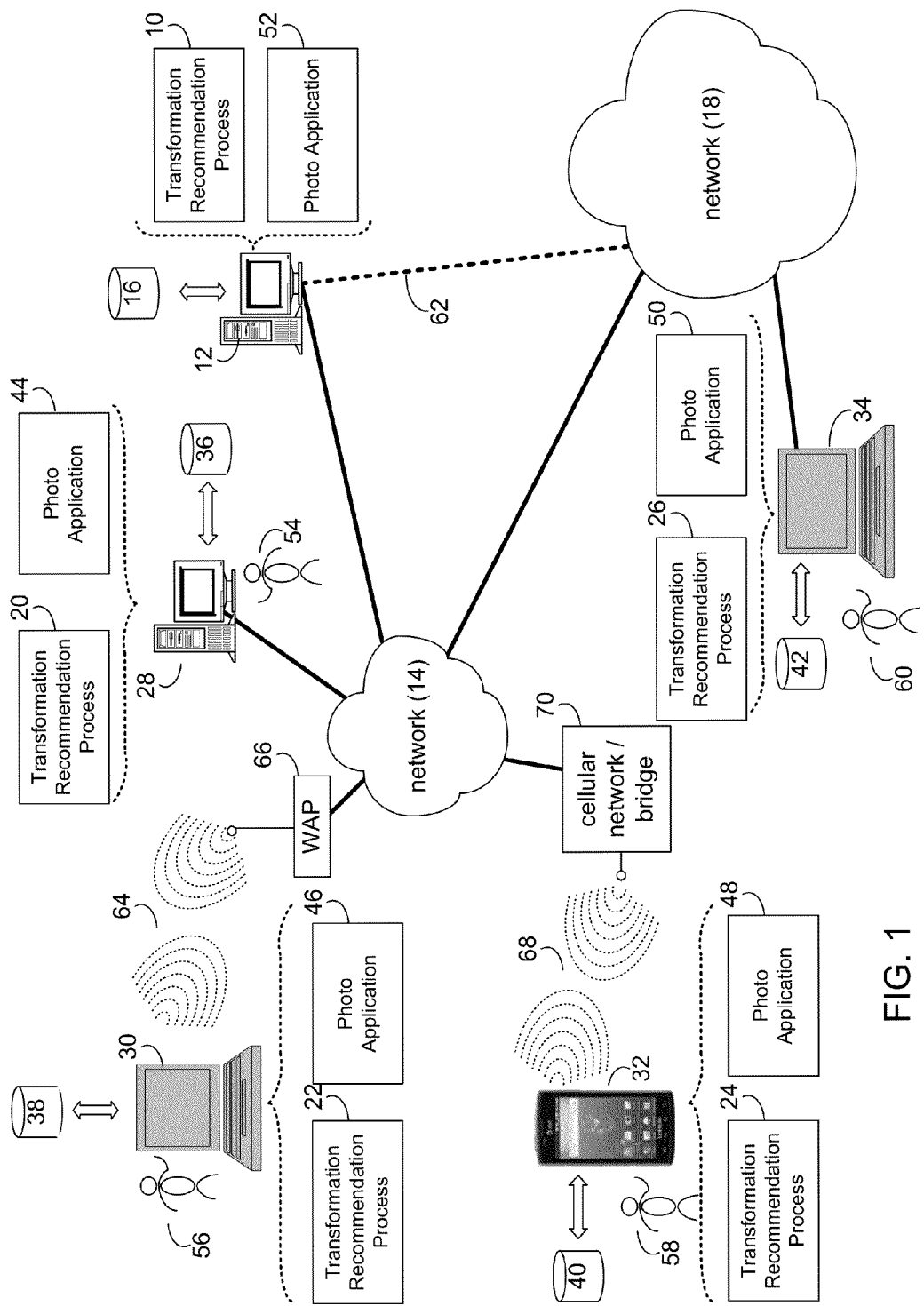
FIG. 1 is a diagrammatic view of a transformation recommendation process coupled to a distributed computing network.

Individuals may take photographs using a variety of camera devices. In certain embodiments, individuals may employ digital cameras to capture digital photographs. In certain embodiments, such digital cameras may be camera-equipped mobile computing devices such as cell phones or tablets.

In certain embodiments, individuals may utilize a photo application ("PA") or process to facilitate capturing, editing and/or sharing photographic images. For example, a camera-equipped cell phone may include a PA that facilitates use of the phone's camera to take pictures. In certain embodiments, a PA may facilitate capture of video in addition/as an alternative to still photographs. In certain embodiments, a PA may facilitate uploading photographs to remote storage devices or other remote systems or processes. This may facilitate, for example, sharing of photographs among groups and individuals. For example, a PA may facilitate an individual capturing a digital photograph, then uploading the photograph to a social networking application (and/or website and so on). In certain embodiments, a PA may associate and/or facilitate associating various metadata with photographs. For example, an individual may sometimes use a PA to electronically associate with a photograph a comment regarding the content of the photograph. In certain embodiments, associated metadata may include date and location information, and/or a variety of other information relevant to the photograph, the individual who captured, shared, and/or commented on the photograph, and so on.

As noted above, in certain embodiments, PAs (and/or other applications or processes) may facilitate editing images. For example, using a PA an individual may apply one or more image filters to photographs. For example, a PA on a cell phone (or other camera-equipped device) may facilitate selecting a particular filter and various associated parameters to apply to a captured digital photograph. In certain embodiments, using a PA (and/or other processes or applications) an individual may capture a digital photograph, apply a digital filter (or filters) to the photograph, and share the altered digital photograph with friends on a social networking (or other) application.

In general, a filter is a physical object, and/or a process or application that, when applied to an image, results in a change in the appearance (or other transformation) of that image. It will be understood that filters may take a variety of known forms. For example, a filter may be a physical attachment or object interposed between the scene of an image and an image recording device (e.g., a lens accessory for a camera, such as a polarizing lens attachment, that alters the optical path of light associated with an image). In certain embodiments, a filter may be an electronic process or application that approximates the effect of a physical filter (and/or other effects) through manipulation of digital information associated with an image. In certain embodiments, a filter may be another object, process, or application. It will further be understood that applying a filter to an image may affect the appearance (or other aspects) of the image in various ways. For example, application of a filter may result in adjustments to the color and/or color balance of a photograph, may enhance or reduce the effect of certain types of light, may cause a photograph to display various effects (e.g., vignetting, aging, spot-focus, dodging (lightening), burning (darkening), tilt-shifting, and so on), may apply borders, shading or other effects, and so on. Filters may sometimes be applied in combination with various effects. For example, two or more filters may be applied sequentially in order to produce a certain combined effect on a photo. In certain embodiments, filters may be applied to selected portions of an image (e.g., particular sets of pixels in a digital image) and/or may be applied to an image as a whole.

To facilitate the application of appropriate filters to photographs (and other objectives), a transformation recommendation ("TR") process may, for example, recommend one or more filters to be applied to a photograph (e.g., a digital photograph) based on a variety of criteria. In certain embodiments, a TR process may identify similarities between a target photograph (or "photo") and one or more reference photos. (It will be understood that although example TR process functionality may be described below in contexts relating to photography, a TR process may also suitably be applied to various other image types.) For example, a TR process may identify similarities in the content of a target image and the content of various reference photos. For example, a TR process may identify particular objects, scenery, patterns, colors, and so on that are similar between a reference photo and a target photo. In certain embodiments, a TR process may identify a main object in a target photo and may identify reference photos also containing a similar main object. In certain embodiments, a TR process may identify other similarities between target and reference photos (e.g., date, time, author, location, camera-equipped device used to capture the photo, and so on). In certain embodiments, a TR process may identify reference photos that have a high degree of popularity (e.g., have been viewed often, frequently commented on or shared, highly rated, and so on).

In certain embodiments, in order to facilitate choosing an appropriate filter for a target image, a TR process may identify one or more filters that have been applied to certain of the identified reference photos (i.e., those photos that have been identified has sharing certain similarities with the target photo). For example, a TR process may identify particular filters have been applied to particular reference images using metadata, color analysis, and/or other known techniques. A TR process may then recommend for and/or apply to a target image the particular filters that were identified as having been applied to the identified reference images. In certain embodiments, this may be useful, for example, because filters that have been widely, popularly, and/or successfully applied to certain reference images may be well-suited for application to similar target images (e.g., target images with similar content, composition, and so on as the reference images).

As will also be discussed below, a TR process may be implemented in a variety of ways. For example, a TR process may be implemented as part of (or in conjunction with) a PA. In certain embodiments, a TR process may be implemented as part of (or in conjunction with) an image-editing program or program suite, a social networking application, and/or a communication application (e.g., an application facilitating exchanges of email, texting, video-chat, and so on). In certain embodiments, a TR process may be implemented as part of a mobile computing device such as a cell phone or tablet. In certain embodiments a TR process may be implemented as part of a camera-equipped device such as a digital camera, camera-equipped cell phone or tablet, and so on.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, a TR process may be coupled to a computer or computer network. For example, server TR process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server TR process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademark of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client TR processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client TR processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the TR process may be a server-side process (e.g., which may be implemented via server TR process 10), in which all of the functionality of the TR process may be executed on a server computer (e.g., server computer 12). In an embodiment, the TR process may be a client-side process (e.g., which may be implemented via one or more of client TR processes 20, 22, 24, 26), in which all of the functionality of the TR process may be executed on a client computing device (e.g., one or more of client electronic devices 28, 30, 32, 34). In an embodiment, the TR process may be a hybrid server-client process (e.g., which may be implemented by server TR process 10 and one or more of client TR processes 20, 22, 24, 26), in which at least a portion of the functionality of the TR process may be implemented via server computer 12 and at least a portion of the functionality of the TR process may be implemented via one or more client computing devices (e.g., one or more of client electronic devices 28, 30, 32, 34).

A photo application ("PA") (and/or photo process) may operate on a client device (e.g., client PA 44, operating on client electronic device 28; client PA 46, operating on client electronic device 30; client PA 48, operating on client electronic device 32; or client PA 50, operating on client electronic device 34). A client TR process (e.g., client TR process 20) or a server TR process (e.g., server TR process 10) may be in communication and/or interact with a client PA (e.g., client PA 44) or may be part of a client PA. Further, in an embodiment a client TR process may include a module and/or component of a client PA. In such an embodiment at least a portion of the functionality of the TR process may be provided by the client PA.

A PA may additionally or alternatively operate on a server device (e.g., server PA 52, operating on server computer 12 or another server PA (not shown), operating on another server computer (not shown)). A server TR process (e.g., server TR process 10) or a client TR process (e.g., client TR process 20) may be in communication and/or interact with a server PA (e.g., server PA 52) or may be a part of a server PA. Further, in an embodiment a server TR process may include a module and/or a component of a server PA (or vice versa). In such an embodiment at least a portion of the functionality of the TR process may be provided by the server PA (or vice versa).

In addition to functionality generally related to photography and so on, in certain embodiments, a PA may provide (and/or interact with other applications or processes providing) social networking application functionality. For example, a PA may facilitate posting, sharing, commenting on, editing, and so on of photographs through a social networking application (or process). In certain embodiments, PA functionality may additionally/alternatively be included within a social networking application (not shown). Additionally/alternatively one or more of a client (and/or server) PA and/or a client (and/or server) TR process may interface and or interact with a social networking application (not shown), which may reside on and/or be executed by, at least in part, server computer 12 and/or another computing device.

Users 54, 56, 58, 60 may access a TR process in various ways. For example, these users may access server TR process 10 directly through the device on which a client process (e.g., client TR processes 20, 22, 24, 26) is executed, namely client electronic devices 28, 30, 32, 34. Users 54, 56, 58, 60 may access server TR process 10 directly through network 14 and/or through secondary network 18. Further, server computer 12 (i.e., the computer that executes server TR process 10) may be connected to network 14 through secondary network 18, as illustrated with phantom link line 62. Users 54, 56, 58, 60 may also access a client or server PA in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client TR process 24 will be described for illustrative purposes. It will be understood that client TR process 24 may, for example, interact and/or communicate with a server TR process such as server TR process 10 and/or may be executed within one or more applications that allow for communication with other server and/or client TR processes. TR process 24 may be utilized as part of or in conjunction with a variety of server and/or client PA applications, such as client PA 48 or server PA 52. In certain embodiments TR process 24 may be utilized as part of or in conjunction with a variety of other consumption applications and/or communication applications (not shown), facilitating consumption of content and/or communication among individuals and/or groups. This is not intended to be a limitation of this disclosure, as other configurations are possible. For example, some implementations may include one or more of client TR processes 20, 22, 26 or server TR process 10 in place of or in addition to client TR process 24. Additionally/alternatively, TR process 24 may include stand-alone client processes and/or stand-alone server processes, TR process may be utilized as part of or in conjunction with client PA 44, 46, 50 or another server PA or other applications (not shown), and so on.

Figure 2:
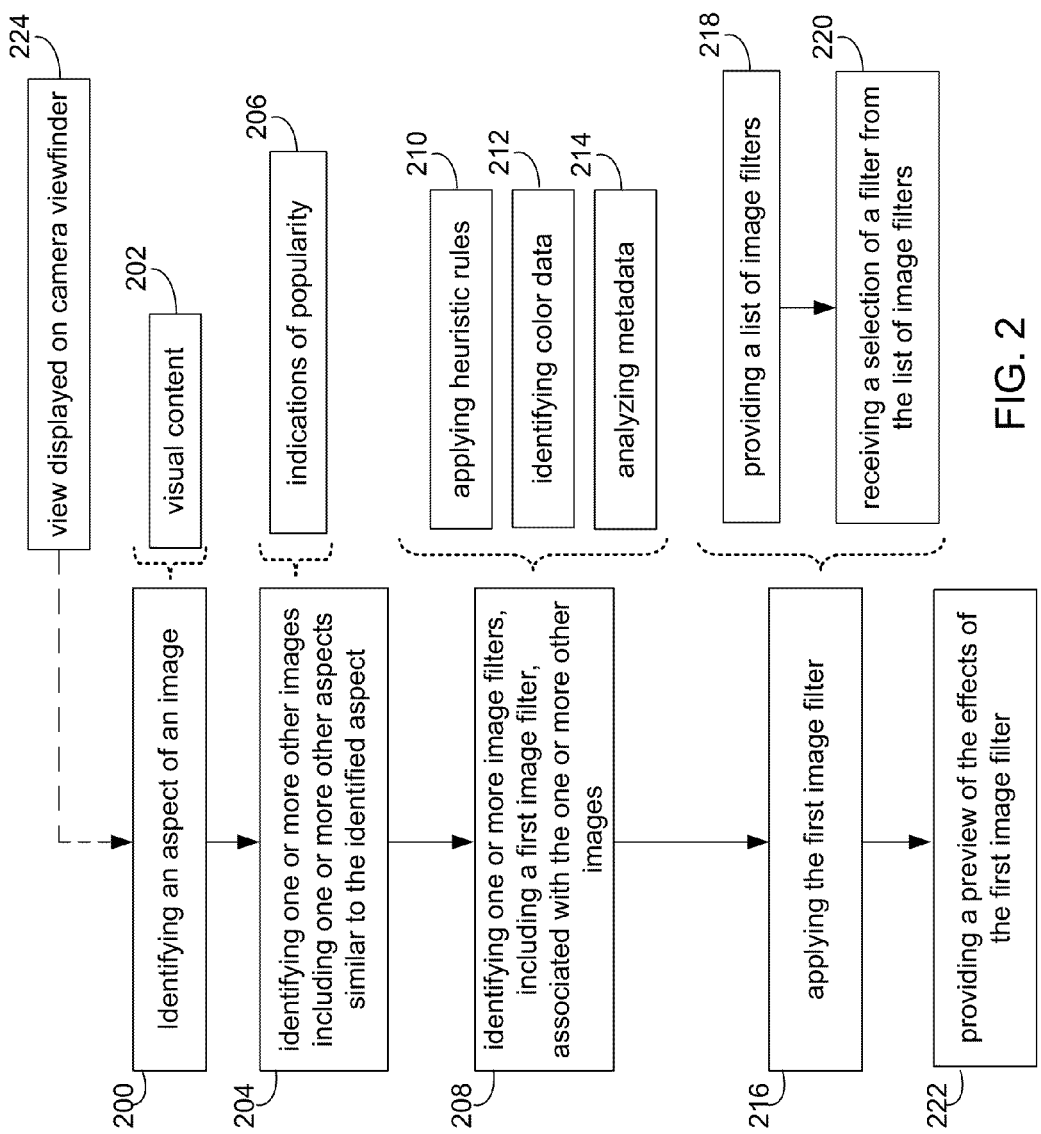
FIG. 2 is a flowchart of a process executed by the transformation recommendation process of FIG. 1.

Referring now also to FIG. 2, there is shown a diagrammatic view of an example process that may be implemented by a TR process, e.g., client TR process 24. TR process 24 may identify 200 an aspect of an image. An image for which an aspect may be identified 200 may be referred to herein as a "target image." A target image may be accessed in a variety of known ways. In certain embodiments, a target image may be provided by a PA (e.g., a PA operating on a camera-equipped cell phone, such as data-enabled mobile telephone 32). For example, an individual may capture a photo using a PA on camera-equipped cell phone 32 (e.g., PA 48) and TR process 24 may utilize the captured photo (and/or a copy thereof) as a target image. In certain embodiments, a target image may be received from various other applications, processes and/or repositories. For example, TR process 24 may receive a target image from a photo storage repository (e.g., storage device 40), from a social networking or other application (not shown), and so on. In certain embodiments, target images may be stored in the same device on which TR process 24 resides (e.g., cell phone 32). In certain embodiments, target images may be stored remotely.

An identified 200 aspect may be any variety of aspects relating to the image and TR process 24 may analyze an image using various known techniques to determine various aspects of the image. For example, TR process 24 may identify 200 a color curve, color balance, brightness, saturation, geometric characteristic or feature, and so on associated with an image. In certain embodiments, TR process 24 may identify 200 subject matter or other content-related aspects of an image. For example, TR process 24 may identify that a particular image includes a landscape scene, a particular animal, a group of party-goers, a baby, a composition of geometric shapes, and so on. In certain embodiments, TR process 24 may identify various other aspects of the image. For example, TR process 24 may identify 200 location, authorship, time, date, and other information associated with an image.

As also noted above, an identified 200 aspect may be associated with visual content 202 of the image. For example, using known image-analysis techniques TR process 24 may identify 200 that a particular image includes visual content of a certain type such as a particular type of animal, a particular type of scene, a particular color curve, color balance, focal point, geometric composition, and so on.

TR process 24 may identify 204 a different image than the image for which an aspect has been identified 200 (i.e., a different image than a target image). (Such an identified 204 image may be referred to herein as a "reference image.") A reference image may be identified 204 based upon, at least in part, the reference image including one or more aspects similar to one or more identified 200 aspects of the target image. For example, TR process 24 may identify 204 an image that has a similar main focus, similar color curve, similar visual content, similar time and date information, and so on, as a target image.

A reference image may reside in and/or be received from a variety of locations, processes, and/or applications. In certain embodiments, a reference image may be provided by a PA (e.g., a PA operating on a camera-equipped cell phone, such as PA 48 on cell phone 32). For example, an individual may capture a photo using a PA on a cell phone and TR process 24 may utilize the captured photo (and/or a copy thereof) as a reference image. In certain embodiments, a reference image may be received from various other applications, processes and/or repositories. For example, TR process 20 may receive a reference image from a photo storage repository (e.g., storage device 40), from a social networking or other application (not shown), and so on. In certain embodiments, identified 204 reference images may be stored in the same device on which TR process 24 resides (e.g., cell phone 32). In certain embodiments, identified 204 reference images may be stored remotely.

TR process 24 may identify 204 one or more reference images based upon various known analyses, which may facilitate identifying various types of similarities between the reference image and a target image for which one or more aspects have been identified 200. For example, TR process 24 may identify 200 a target image with particular visual content—e.g., an image with a herd of deer, wherein the image also includes a particular color curve exhibiting strong reddish tones and a composition of stark vertical lines (e.g., tree trunks surrounding the deer). TR process 24 may then identify 204 one or more reference image exhibiting a particular similarity to various identified 200 aspects of the target image. For example, TR process 24 may identify 204 reference image that also include herds of grazing animals (e.g., herds of deer, herds of antelope, and so on), and/or that also include similar color curves exhibiting strong reddish tones and/or a composition including stark vertical lines.

In certain embodiments, an image may be identified 204 based upon, at least in part, indications of popularity 206. For example, it may be useful to identify 204 reference images that have been highly rated, frequently viewed, frequently commented upon, and so on. For example, such indications of popularity 206 may indicate that the identified 204 reference images have been viewed as particular good images (e.g., which may result, at least in part, because appropriate filters were applied to the images). For example, TR process 24 may identify 204 reference images that have accumulated more than a certain number of comments, positive ratings and so on through a social networking application. These (and other) factors may indicate, for example, that other individuals have enjoyed viewing these identified 204 reference images. In certain embodiments, user preferences and/or input may inform identifying indications of popularity 206. For example, a photographer who has captured a target image may indicate that she particularly enjoys the photographs of a number of other individuals (and/or a particular type of image from a particular individual). As such, TR process 24 may determine that, with respect to this particular photographer, the photographs of the indicated other individuals (and particularly the particular individual) have high indications of popularity 206.

TR process 24 may identify 208 an image filter associated with the identified 204 reference image. In certain embodiments, TR process 20 may identify 208 a filter that has been previously applied to one or more reference images. As noted above, TR process may facilitate choosing an appropriate filter (or filters) to apply to a target image. As such, it may be useful to identify 208 a previous application of various filters to similar images (e.g., similar images with high indications of popularity 206). In certain embodiments, an identified 208 filter may be a physical filter (e.g., a lens attachment) that was utilized in capturing a reference image. In certain embodiments, an identified 208 filter may be an electronic filter (e.g., an electronic process or application) that was, for example, utilized to transform a reference image after the reference image was captured.

TR process 24 may identify 208 the use of an image filter on an identified 204 reference image using a variety of known techniques. In certain embodiments, TR process 24 may identify 208 the use of an image filter based upon, at least in part, applying 210 various heuristic rules. For example, in certain embodiments it may be possible to identify various heuristic analysis rules that may permit determination of whether a particular filter has been applied to a particular image. For example, application of a vignette filter to an image may result in an image in which the edges of the filtered image are darkened but the center of the image remains bright. As such, heuristic rules directed toward identification of such a darkening pattern may facilitate identification 208 of the use of a vignette filter. Similarly, for example, a spot-focus filter may result in a particular region of an image being in focus while the remainder of the image is out of focus. As such, for example, heuristic rules directed toward identification of such sharp and/or blurry regions may facilitate identification 208 of the use of a spot-focus filter. Similarly, an image with a deep blue sky and "warmer" (i.e., more red) ground objects may indicate the application of a blue-yellow polarizer filter. As such, for example, heuristic rules directed toward identification of deep blue skies and redder ground objects may facilitate identification 208 of the use of a blue-yellow polarizer filter.

In certain embodiments, TR process 24 may identify 208 the use of an image filter based upon, at least in part, identifying 212 color data associated with the identified 204 reference image. In certain embodiments, TR process 24 may identify the application of a particular color-related filter (and/or filter type) based upon identifying 212 such color data. For example, TR process may identify 212 a particular color histogram, color profile, preponderance of particular colors, and so on for a reference image. This may indicate, in certain embodiments, for example, that a particular color-related filter has been applied to such a reference image. For example, if a color histogram of a particular reference image is skewed strongly away from red and strongly towards blue, TR process 24 may identify 212 such a histogram as indicating that one or more color filters was applied to the reference image that removed red tones and added and/or enhanced blue tones. As such, TR process 24 may identify 208 the use of such a color-related filter based upon identifying 212 the histogram color data.

In certain embodiments, TR process 24 may implement a learning process or algorithm in order to associate particular color curves (e.g., particular color histograms) with particular subject matter, photographers, locations, times, and so on. For example, TR process 24 may determine that color curves associated with highly-rated photographs of camels may exhibit certain general (and/or particular) characteristics. TR process 24 may use such a determination, for example, to identify 208, as potentially suitable for at target image of camels, a filter that adjusts a color curve to exhibit such characteristics.

In certain embodiments, TR process 24 may identify 208 the use of an image filter based upon, at least in part, analyzing 214 metadata associated with an identified 204 reference image. For example, metadata associated with an image may indicate where an image was recorded, who recorded the image, what type of device was used to record the image (e.g., a camera or mobile phone type), individuals who have viewed and/or edited the image, and so on. In certain embodiments, metadata associated with an identified 204 reference image may indicate other information regarding changes made to the reference image after it was first recorded (and/or a physical filter utilized in capturing the reference image). For example, such metadata may identify a particular image filter (and/or filter type) that may have been applied to the reference image and/or an order in which multiple image filters (and/or filter types) may have been applied. As such, for example, it may be useful for TR process 24 to analyze 214 metadata associated with an identified 204 reference image to identify 208 the use of an image filter on the reference image. (It will be understood that TR process 24 may similarly analyze image metadata as part of implementing other functionality such as, for example, identifying 204 an image with aspects that are similar to a target image, identifying 200 an aspect of a target image, and so on.)

In certain embodiments, TR process 24 may identify 208 an image filter that may not have been applied to a reference image but which may transform an aspect of a target image to more closely resemble an aspect of the reference image. For example, continuing the example above, TR process 24 may identify 204 various reference images that are similar to a target image in that the target and reference images all include herds of four-legged animals, a composition of vertical lines, and various colors. TR process 24 may further identify various differences between the target and reference images. For example, TR process 24 may compare one or more color curves associated with certain highly rated reference images with the color curve of the target image in order to determine, for example, that the target image color curve is skewed more heavily toward reddish colors than the color curves of the reference images. In certain embodiments, for example, this may result not from application of a particular filter to the reference images but from inherent differences between the target image and the reference images (e.g., the quality of the light available when the various images were captured). In this and other embodiments, TR process 24 may, based for example on the identified differences between the target and reference images, identify 208 a filter that if applied to the target image, may reduce the magnitude of the identified differences and/or increase the magnitude of identified similarities (i.e., may transform the appearance of the target image to be more similar to the appearance of certain reference images). For example, TR process 24 may determine that applying a filter that causes the color curve of the target image of deer to skew less heavily toward reddish colors may cause the color curve of the target image to more closely match the color curve of certain of the highly rated reference images of other herd animals. As such, TR process 24 may identify 208 such a filter, associated with the reference images, as appropriate for transformation of the target image.

TR process 24 may apply 216 to a target image an identified 208 image filter (e.g., a filter that has been identified 208 as having been used on an identified 204 reference image). For example, having identified 204 aspects of a reference image that are similar to aspects of a target image, and having identified 208 the use of a particular filter on the reference image, TR process 24 may recommend applying 216 and/or may apply 216 the identified 208 filter (i.e., the filter that was applied to similar reference images) to the target image. In this way, for example, TR process 24 may facilitate application 216 of appropriate filters to target images (e.g., application 216 of filters commonly associated with images including particular aspects, application 216 of filters commonly associated with highly-rated images including particular visual content 202, and so on).

TR process 24 may apply 216 an image filter automatically and/or based upon various input and/or preferences of a user, administrator, and/or system. For example, in certain embodiments, based on a user preference, TR process 24 may automatically apply 216 to a particular target image a filter associated with the most popular identified 204 reference image (i.e., the identified 204 reference image with the strongest indications of popularity 206). In certain embodiments, TR process 24 may apply 216 only filters from photographers/editors approved by the creator of a target image (or only filters that have been applied to images approved by the creator, and so on). In certain embodiments, TR process 24 may apply 216 filters based on various other preferences and/or inputs.

In certain embodiments, TR process 24 may identify 208 multiple filters (e.g., that have been applied, individually or collectively, to multiple identified 204 reference images) that potentially may be applied 216 to a target image. In order to determine which (if any) of the multiple filters to actually apply 216, TR process 24 may provide 218 a list of the identified 208 filters to a user (e.g., a user of a device used to record, edit, or upload a target image, and so on). In such a case, for example, TR process 24 may receive 220 (e.g., from such a user) a selection of one or more filters from the provided 218 list, and may apply 216 the selected filters to the target image.

In certain embodiments, TR process 24 may provide 222 a preview of the effects of a particular image filter (e.g., an image filter identified 208 as having been applied to a reference image) on a target image. For example, before (and/or after) recording a transformed version of a target image (e.g., before replacing the target image on a storage device with a filtered version of the target image and/or creating a copy of the target image including the effects of the image filter) TR process 24 may provide 222 to a user (e.g., the creator of the target image) a depiction of the effect of the applied 216 (and/or to-be-applied 216) image filter on the target image. This may, for example, facilitate a user deciding whether a particular identified 208 filter should be applied at all and/or whether particular parameters related to the filter (e.g., color curve levels, degree of vignetting, and so on) should be adjusted (e.g., through a user input). In certain embodiments, providing 222 a preview may facilitate a user deciding which filter(s) to select from a provided 218 list of image filters.

In certain embodiments, the target image may include a view 224 displayed on the viewfinder of a camera device (e.g., a digital camera, digital video-camera, camera-equipped cellular phone, and so on). For example, as a user scans a scene in order to identify a subject for a photograph, the portion of the scene that is currently in view (i.e., the portion that would be included in an image if an image were captured by the camera at a particular moment) may be displayed on a viewfinder screen of the camera device. In order, for example, to provide a preview of how a transformation of such a (potential) image would appear, TR process 24 may provide 222 a preview of the effects of one or more filters on the portion of the scene that is currently in view on the viewfinder. For example, TR process 24 may, continuously or at various intervals, identify 200 one or more aspects of the scene in the viewfinder (i.e., the target image) and may identify 204 one or more other (reference) images including aspects similar to the image in the viewfinder screen. TR process 24 may identify 208 one or more particular filters associated with the identified 204 reference images (e.g., that have been applied to the reference images) and may select certain of those filters (e.g., based upon user input) to be applied 216 to the target image (i.e., the image in the camera viewfinder). In this way, for example, a user may view in real time (or quasi-real time) how a particular image would appear if a particular filter were applied to it before (and/or after) actually capturing the particular image (i.e., before the image represented in the viewfinder is stored in the main storage memory of the camera).

It will be understood that in this and other embodiments identifying 204 reference images may be accelerated, for example, by creating and/or maintaining a database in which aspects of various reference images (e.g., various popular images) have been partially or fully categorized and/or organized for rapid searching. For example, it may be useful to create and/or maintain reference image databases organized by identified 200 visual content 202, by identified 208 previously-applied image filter, by identified 212 color data, and so on. In this way, for example, TR process 24 may, in certain embodiments, more rapidly and/or efficiently identify 204 reference images and/or identify 208 the use of particular filters on particular reference images.

As also noted above, in certain embodiments, various functionality of TR process 24 may be executed in real time and/or quasi-real time. (Quasi-real time may indicate, for example, that certain functionality is executed in such a way that a user perceives little or no lag time and/or is executed including a time lag that may result from, for example, network latency, processing time, and so on.) For example, as also noted above, if the target image is a view 224 on a camera viewfinder, it may be useful to provide 222 a preview of the effects of an image filter even before an image is taken using the camera. As such, for example, as a user pans across a scene with the camera, the viewfinder may display, in real time or quasi-real time, what a recorded image of the current view would look like if a particular image filter were applied 216. In certain embodiments, such a preview may include representations of the application 216 of multiple identified 208 image filters applied 216 individually and/or in combination. For example, if a list of identified 208 image filters has been provided 218, one quadrant of a viewfinder may display a view with no applied 216 filters, two quadrants of a viewfinder may display a view with two different filters applied 216, respectively, and one quadrant of the viewfinder may display a view with both of the two different filter applied 216 together. In this way, for example, as a user pans across a scene, TR process 24 may continually (and/or near-continually) identify 200 aspects of the current view, identify 204 reference images, identify 208 image filters that have been applied to the reference images, and provide 222 a preview of the effects of the various identified 208 image filters on the current camera view. As such, for example, TR process 24 may facilitate an individual choosing a filter (or filters) and recording a particular viewfinder view 224 as a digital image with the chosen filter (or filter) applied to the recorded image.

Figure 3:
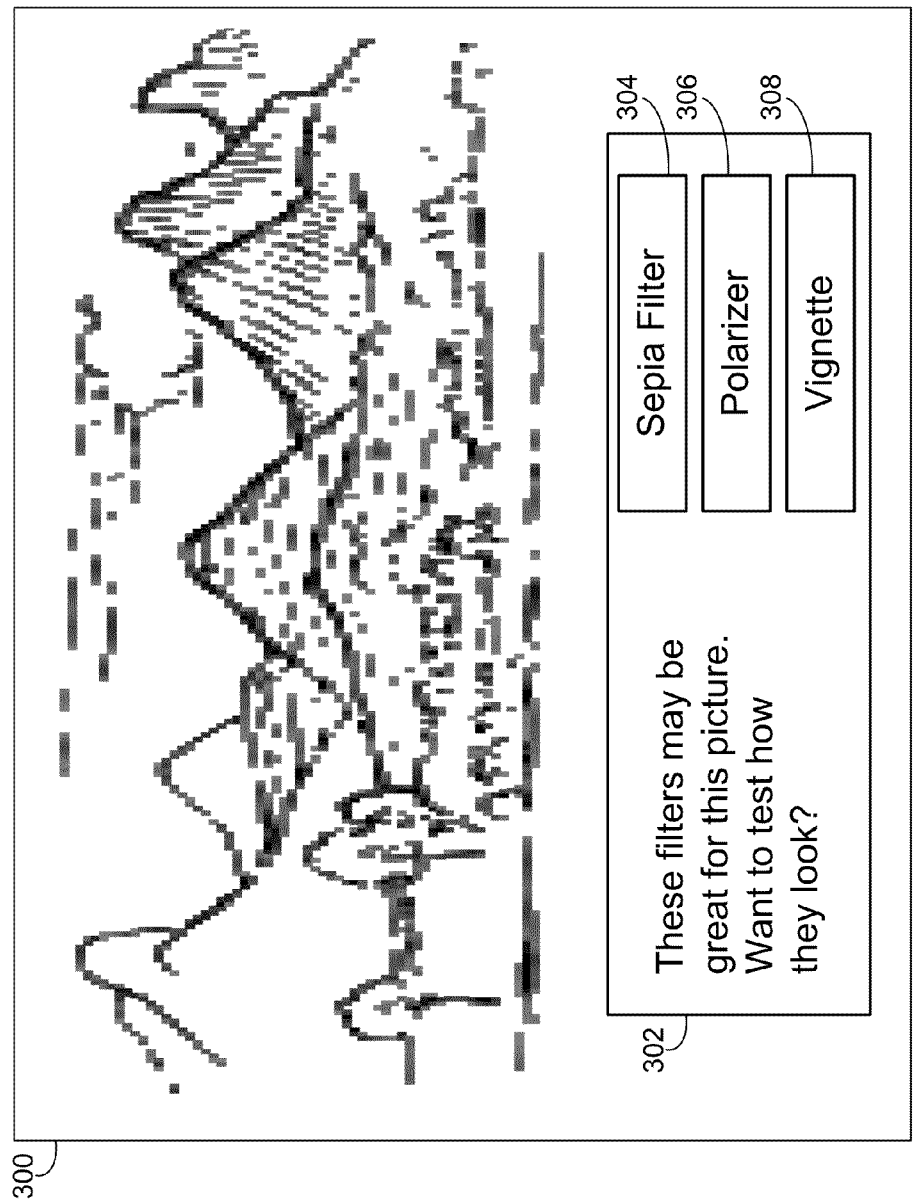
FIG. 3 is a diagrammatic view of an implementation of the transformation recommendation process of FIG. 1.

Referring now also to FIG. 3, there is shown a diagrammatic view of an implementation of TR process 24. For example, an individual may have captured (e.g., (e.g., stored on a camera-equipped mobile device) image 300 of a mountain landscape and may desire to upload the image to a social networking application so that it may be shared with other individuals. In certain embodiments, TR process 24 may have identified 208 three possible filters for the image filters based upon identifying 200 various aspects of image 300 and identifying 204 similar reference images. For example TR process 24 may have identified 200 aspects such as the target image including a landscape, including mountains, being over-exposed, being taken near Palermo, Italy, including a river, being taken in the late morning in January, including vibrant shades of brown and green, and so on. TR process 24 may also have identified 204 various reference images with high indications of popularity 206 wherein the reference images also include aspects such as including mountains, being taken near Palermo, being taken in the late morning in winter, and so on. TR process 24 may have further identified 208 that many of these various reference images may have been transformed using, for example, Sepia Filters, Polarizers, and Vignette Filters, in various combinations.

As such, for example, as part of (and/or a precursor to) uploading the target image, TR process 24 may provide window 302 to facilitate selection of one or more particular filters from a provided 218 list of identified 208 filters (i.e., Sepia Filter, Polarizer, Vignette Filter) and may receive 220 a selection by a user of one or more of those filters. For example, TR process 24 may, via window 302, receive 220 a selection of one or more of the identified 208 filters by the uploading user via selection by the user of one or more of action buttons 304, 306, and 308. In certain embodiments, TR process 24 may provide 222 a preview of applying 216 a selected filter before the transformation and/or upload of the target image is completed. For example, a user may select the Sepia Filter using action button 304 and the Polarizer filter using action button 306 and TR process 24 may provide 222 a preview of the effects of those filters on the image before transforming the image file (and/or a copy thereof). In certain embodiments, for example, upon viewing the provided 222 preview, the user may not like the cumulative effect of the selected filters, and may accordingly change the selection before uploading. For example, the user may decide to apply the Sepia and Vignette Filters instead and may accordingly select those filters in window 302.

Figure 4:
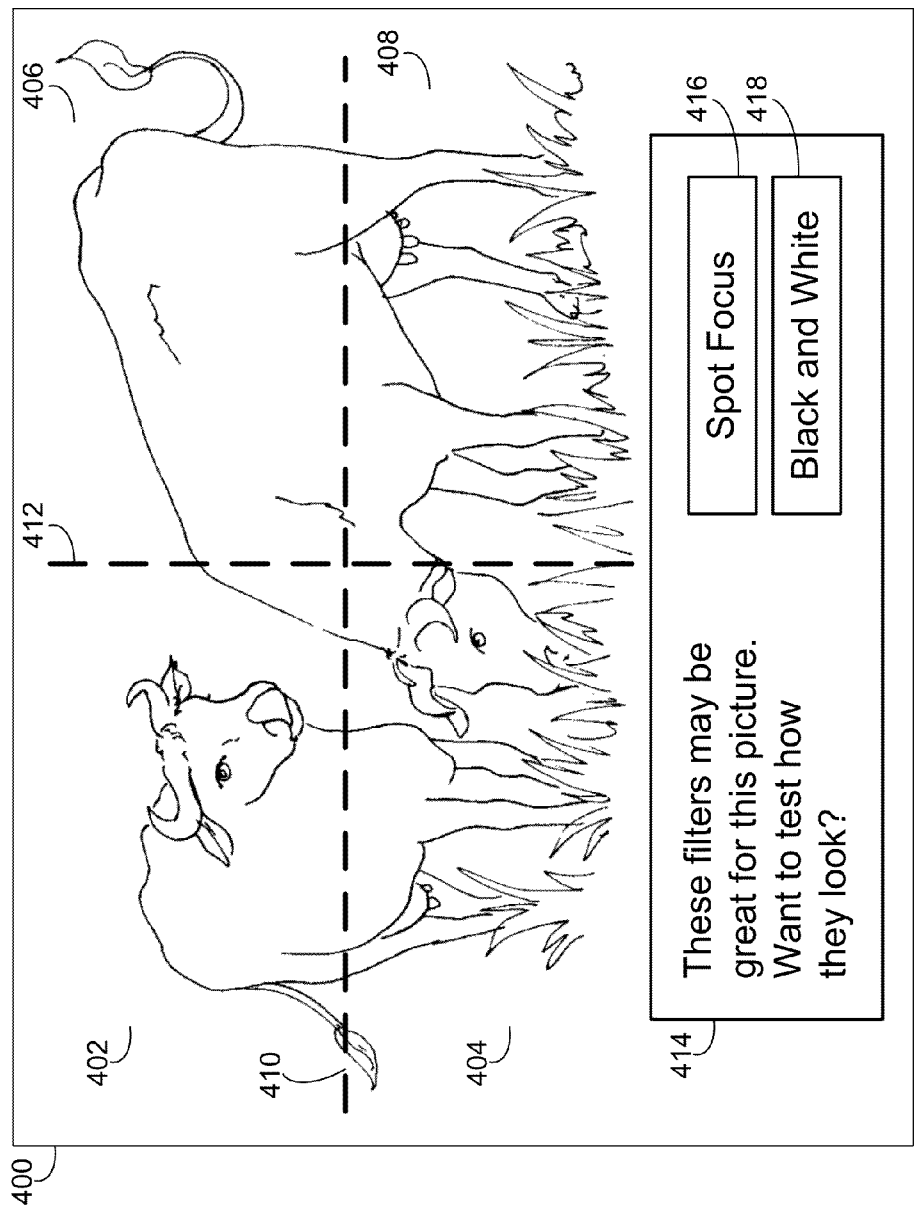
FIG. 4 is a diagrammatic view of an implementation of the transformation recommendation process of FIG. 1.

Referring now also to FIG. 4, there is shown a diagrammatic view of an implementation of TR process 24. As noted above, in certain embodiments, TR process 24 may apply 216 an image filter to a view 224 displayed on a camera viewfinder. As also noted above, this may, for example, facilitate providing 222 a quasi-real time preview of the effects of an image filter on an image (and/or potential image) of a particular scene.

TR process 24 may apply 216 an image filter to a viewfinder view 224 in various ways. For example, in certain embodiments, TR process 24 may provide 222 multiple previews on the same viewfinder with respect to the same view 224. For example, a viewfinder (e.g., viewfinder 400) may be divided into quadrants 402, 404, 406 and 408 (as indicated for example, by quadrant axes 410 and 412). TR process 24 may identify 200 an aspect of the target image (e.g., that the view 224 includes a pastoral scene featuring dairy cows), may identify 204 similar reference images, and may identify 208 various filters associated with those identified 204 reference images. TR process 24 may accordingly utilize window 414 to provide 218 a list of such identified 208 filters such as spot focus 416 and black and white 418 filters. These suggested filters may, for example, change in quasi-real time as the user pans the camera across the scene and other aspects of the scene and/or other reference images are accordingly identified 200, 204.

In certain embodiments, TR process 24 may provide 222 a preview of what image would be captured (and/or how a captured image would appear) if a selected filter was applied 216. In certain embodiments, providing 222 such a preview may be based upon a user input. For example, via input window 414 a user may indicate that TR process 24 should apply (e.g., as a preview) spot focus filter 416 in quadrant 402, black and white filter 418 in quadrant 404, both filters in quadrant 406, and neither filter in quadrant 408 (i.e., provide an unfiltered view in quadrant 408). In this way, for example, an individual may be able to determine which (if any) filter(s) the individual would like to apply to the image she intends to capture.

Continuing the example above, when an image is captured, a camera-equipped device may, in certain embodiments, capture only an un-filtered image to which a selected filter may subsequently be applied 216. In certain embodiments, a camera-equipped device may additionally/alternatively capture a filtered image. For example, in certain embodiments, the camera-equipped device may capture both an unfiltered and a filtered image associated with the same scene (e.g., the view 224 in viewfinder 400). In certain embodiments, a camera-equipped device may capture only a filtered image (i.e., no unfiltered image may be recorded).

Figure 5:
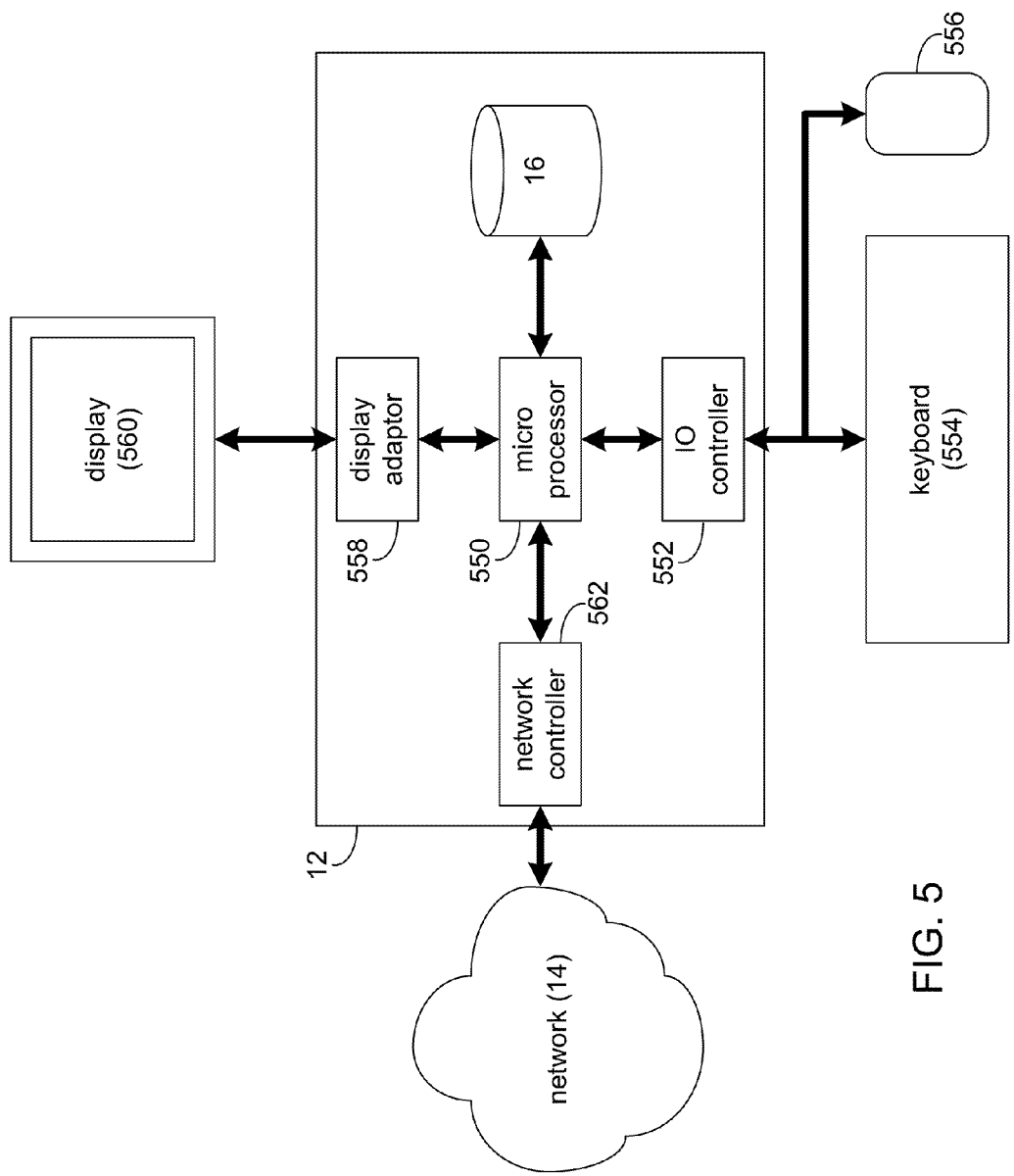
FIG. 5 is a diagrammatic view of a computing system that may execute or be utilized by the gaming group process of FIG. 1.

Referring also to FIG. 5, there is shown a diagrammatic view of an example computing system included in server computer 12. While computing system 12 is shown in this figure, this is for illustrative purposes only and is not intended to be a limitation of this disclosure, as other configuration are possible. For example, any computing device capable of executing, in whole or in part, a TR process (e.g., TR process 10, 20, 22, 24, or 26) may be substituted for the computing system 12 within FIG. 5, examples of which may include but are not limited to client electronic devices 28, 30, 32, 34.

Computing system 12 may include microprocessor 550 configured to e.g., process data and execute instructions/code for group profile process 10. Microprocessor 550 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 552 may be configured to couple microprocessor 550 with various devices, such as keyboard 554, mouse 556, USB ports (not shown), and printer ports (not shown). Display adaptor 558 may be configured to couple display 560 (e.g., a CRT or LCD monitor) with microprocessor 550, while network adapter 562 (e.g., an Ethernet adapter) may be configured to couple microprocessor 550 to network 14 (e.g., the Internet or a local area network).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. computer-implemented method comprising:
identifying, by one or more computing devices, a content-related aspect of a captured digital image;
identifying, by the one or more computing devices, one or more other digital images based upon, at least in part, the one or more other digital images including one or more other content-related aspects same as or similar to the identified content-related aspect of the captured digital image;
analyzing visual content of the one or more other digital images to identify, by the one or more computing devices, one or more image filters, including a first image filter and a second image filter that transformed the one or more other digital images after capture;
providing a list of image filters including the one or more identified image filters;
receiving a selection of the first image filter and the second image filter from the list of image filters; and
transforming the captured digital image by applying, by the one or more computing devices, the first image filter and the second image filter to the captured digital image.

2. The computer-implemented method of claim 1 wherein identifying the one or more other digital images is based upon, at least in part, one or more indications of popularity associated with the one or more other digital images.

3. The computer-implemented method of claim 1 wherein analyzing the visual content to identify the one or more image filters, including the first image filter that transformed the one or more other digital images after capture, comprises applying heuristic rules to identify application of the one or more image filters.

4. The computer-implemented method of claim 1 wherein analyzing the visual content of the one or more other digital images to identify one or more image filters, including the first image filter that transformed the one or more other digital images after capture comprises identifying application of a color-related filter based upon, at least in part, identifying color data associated with the one or more other digital images.

5. A computer-implemented method comprising:
identifying, by one or more computing devices, an aspect of a captured image;
identifying, by the one or more computing devices, one or more other images based upon, at least in part, the one or more other images including one or more other aspects same as or similar to the identified aspect of the captured image;
analyzing visual content of the one or more other images to identify, by the one or more computing devices, one or more image filters, including a first image filter and a second image filter that transformed the one or more other images after capture;
providing a list of one or more image filters including the one or more identified image filters;
receiving a selection of the first image filter and the second image filter from the list of one or more image filters; and
transforming the captured image by applying, by the one or more computing devices, the first image filter and the second image filter to the captured image.

6. The computer-implemented method of claim 5 wherein the aspect of the captured image is associated with visual content of the captured image.

7. The computer-implemented method of claim 5 wherein the list of image filters includes more one listed image filters and further comprising:
providing a preview of the captured image with representations of effects of the more than one listed image filters applied individually on the captured image.

8. The computer-implemented method of claim 5 wherein identifying the one or more other images is based upon, at least in part, one or more indications of popularity associated with the one or more other images.

9. The computer-implemented method of claim 5 wherein analyzing the visual content to identify the one or more image filters, including the first image filter that transformed the one or more other image after capture comprises applying heuristic rules to identify application of the one or more image filters.

10. The computer-implemented method of claim 5 wherein analyzing the visual content of the one or more other images to identify one or more image filters, including the first image filter that transformed the one or more other image after capture comprises identifying application of a color-related filter based upon, at least in part, identifying color data associated with the one or more other images.

11. The computer-implemented method of claim 5 wherein the image comprises a view displayed on a viewfinder of a camera.

12. A computer program product residing on a non-transitory computer readable medium having a plurality of instructions stored thereon, which, when executed by a processor, cause the processor to perform operations comprising:
identifying an aspect of a captured image;
identifying one or more other images based upon, at least in part, the one or more other images including one or more other aspects similar to the identified aspect of the captured image;
analyzing visual content of the one or more other images to identify one or more image filters, including a first image filter and a second image filter that transformed the one or more other images after capture;
providing a list of one or more image filters including the one or more identified image filters;

receiving a selection of the first image filter and the second image filter from the list of one or more image filters; and transforming the captured image by applying the first image filter and the second image filter to the captured image.

13. The computer program product of claim 12 wherein the aspect of the image is associated with visual content of the captured image.

14. The computer program product of claim 12 wherein the list of image filters includes more one listed image filters and the operations further comprise:

providing a preview of the captured image with representations of effects of the more than one listed image filters applied individually on the captured image.

15. The computer program product of claim 12 wherein identifying the one or more other images is based upon, at least in part, one or more indications of popularity associated with the one or more other images.

16. The computer program product of claim 12 wherein analyzing visual content of the one or more other images to identify the one or more image filters, including the first image filter, comprises applying heuristic rules to identify application of the one or more image filters.

17. The computer program product of claim 12 wherein analyzing visual content to identify the one or more image filters, including the first image filter that transformed the one or more other image after capture comprises identifying application of a color-related filter based upon, at least in part, identifying color data associated with the one or more other images.

* * * * *